R. LINKLETTER.
COMPOSITE BOARD.
APPLICATION FILED DEC. 26, 1914.
1,173,362.
Patented Feb. 29, 1916.
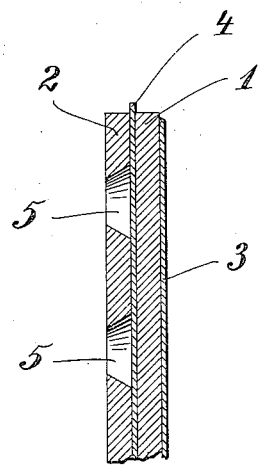
WITNESSES:
Fred. Roegers.
Richard Wegener.
INVENTOR
Robert Linkletter
BY Walton Harrison,
HIS ATTORNEY

UNITED STATES PATENT OFFICE.

ROBERT LINKLETTER, OF JERSEY CITY, NEW JERSEY, ASSIGNOR OF ONE-THIRD TO HIMSELF AND ONE-THIRD TO GEORGE W. MUTTART, OF JERSEY CITY, NEW JERSEY, AND ONE-THIRD TO ALDER C. MUTTART, OF NEW YORK, N. Y.

COMPOSITE BOARD.

1,173,362.      Specification of Letters Patent.      Patented Feb. 29, 1916.

Application filed December 26, 1914. Serial No. 879,108.

*To all whom it may concern:*

Be it known that I, ROBERT LINKLETTER, a citizen of the United States, residing at Jersey City, in the county of Hudson and State of New Jersey, have invented certain new and useful Improvements in Composite Boards, of which the following is a specification.

My invention relates to composite boards of the kind adapted for use as building material, my more particular purpose being to provide a board having generally the form of a plate and made mainly from plastic material, the board having suitable shape to adapt it for clinging automatically to a core or wall of concrete, cement or similar material.

My invention further contemplates giving the plate such a surface as will hold cement, plaster or the like when spread thereover in a plastic state by aid of a trowel or other appropriate implement for the purpose.

My invention also comprehends giving the plate such form that it may be readily standardized, and may be cheaply manufactured from a minimum of raw material.

Reference is made to the accompanying drawing forming a part of this specification, and in which like letters indicate like parts, the figure representing a cross-section through a board made in accordance with my invention.

Two layers 1, 2 of plastic material, such as plaster of Paris, and two sheets 3, 4 of pasteboard are formed into a board, the general structure of which is laminated. The layer 2 is provided with anchor holes 5 which are of frusto-conical form, and bounded in one direction by the sheet 4 of pasteboard. That is to say, the sheet 4 of pasteboard serves as a bottom for the anchor holes. The sheets 3, 4 so brace and strengthen the layer 1 that nails may be driven through this layer without splitting it. The frusto-conical anchor holes have their portions of greatest diameter extending into the board, so that the anchor holes are slightly overhung or overlapped by the adjacent material of the board.

By the use of my composite board, much time and labor may be saved. The board complete is essentially a piece of artificial lumber, of such size and form as to be adapted for immediate use in a multitude of different relations. A typical instance of construction may be a board 32 inches square, half an inch thick, with anchor holes tapering in diameter from a half inch to a quarter inch, the holes each extending substantially half way through the thickness of the board.

The plastic material, such for instance as cement, holds the board permanently in position after setting. Much space is saved by use of the boards employed in this relation.

I do not limit myself to any precise dimensions, or to the use of particular materials, the scope of my invention being commensurate with my claims.

I claim:—

1. A composite board, comprising a layer of plastic material having the general form of a plate and provided with anchor holes extending entirely through it, and a member of sheet material adhering to one side of said plate and closing said holes.

2. A composite board, comprising a layer of plaster of Paris provided with anchor holes extending entirely through it and each having a frusto-conical form, and a member of pasteboard covering one face of said layer and thus closing said holes.

3. A composite board, comprising a layer of plastic material provided with anchor holes extending through it, said holes each having the form of a cone frustom with its base flush with one face of said layer, and a member of sheet material adhering to said layer at the bases thereof.

4. A composite board, comprising a plurality of separate layers of plastic material, and a sheet of pasteboard located between said layers and adhering thereto, one of said layers being provided with anchor holes extending entirely through it and terminating flush with the adjacent surface of said sheet of pasteboard.

5. A composite board comprising a layer of plaster of Paris provided with anchor holes extending entirely through it and each having a frusto-conical form, a member of pasteboard adhering to one face of said layer and closing said holes at the ends thereof having the greatest cross diameter, and a layer of material adhering to said member of pasteboard.

Signed in the presence of two subscribing witnesses.

ROBERT LINKLETTER.

Witnesses:
WALTON HARRISON,
MATTHEW MONAHAN.